(12) United States Patent
Lo et al.

(10) Patent No.: US 7,038,666 B2
(45) Date of Patent: May 2, 2006

(54) PANEL SENSING DEVICE AND POSITIONING LOCATION SEARCHING METHOD OF THE SAME

(75) Inventors: Lih Shang Lo, Juhei (TW); Tung Tsai Liao, Kaohsiung (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 260 days.

(21) Appl. No.: 10/373,744

(22) Filed: Feb. 27, 2003

(65) Prior Publication Data

US 2004/0046750 A1 Mar. 11, 2004

(30) Foreign Application Priority Data

Sep. 9, 2002 (TW) .............................. 91120503 A

(51) Int. Cl.
*G09G 5/00* (2006.01)

(52) U.S. Cl. ................ 345/173; 178/18.01; 178/18.03; 178/18.07; 178/19.01

(58) Field of Classification Search ................ 345/173; 178/18.01, 18.03, 18.05–7, 19.01, 19.03, 178/19.04
See application file for complete search history.

(56) References Cited

U.S. PATENT DOCUMENTS

| | | | | | |
|---|---|---|---|---|---|
| 5,563,381 | A | * | 10/1996 | Crooks et al. | ........... 178/18.03 |
| 5,646,377 | A | * | 7/1997 | Oda | ........................ 178/18.07 |
| 5,909,382 | A | * | 6/1999 | Neoh | ........................ 708/141 |
| 6,400,359 | B1 | * | 6/2002 | Katabami | ................... 345/173 |

\* cited by examiner

*Primary Examiner*—Henry N. Tran
(74) *Attorney, Agent, or Firm*—Bacon & Thomas, PLLC

(57) ABSTRACT

A panel sensing device and a positioning location searching method of the same are disclosed. A control unit serves to provide at least one reference voltage and at least one reference voltage with opposite phase. Thereby, a plurality of position blocks are defined by the electric field distributions produced by the reference voltages. A sensing pen is used to touch the sensing plate for sensing the object voltage of a touch position. The control unit searches the touch position according to the phase and level of the object voltage and the reference voltages.

5 Claims, 4 Drawing Sheets

PANEL SENSING DEVICE AND POSITIONING LOCATION SEARCHING METHOD OF THE SAME

BACKGROUND OF THE INVENTION

1. Field of the Invention

The present invention relates to panel sensing device and a positioning location searching method of the same, in which phase difference is used to determine a touch position of a sensing pen on a sensing plate.

2. Description of the Related Art

In general, an electronic book has a sensing pen and a plurality of sensing pages. The sensing pen is used to touch the sensing pages for selecting desired items. FIG. 1 schematically illustrates a sensing plate of a conventional electronic book 11, wherein two ends A1 and B1 are inputted with driving waveforms for getting the row position of the sensing pen 12. The other two ends C1 and D1 are applied with driving waveforms for getting the column position of the sensing pen 12.

FIG. 2 shows the driving waveforms applied to the four ends A1, B1, C1 and D1. At Initial time, for example 10 to 20 micro seconds, the four ends are applied with identical reference voltage waveforms. Then, at about 6~9 seconds, an addressing voltage waveform (row) is applied to the A1 end so that the sensing pen 12 can sense an electric field waveform, as shown in FIG. 3, by sensing the electric field.

Because the distribution of the electric field is linear, it is able to determine the current touching position of the sensing pen 12 via comparing the voltage that the sensing pen 12 detected in the addressing voltage waveform period (i.e., 6~9 seconds) with the voltage that the sensing pen 12 detected in the reference voltage waveform period (i.e., 0~3 seconds).

However, the sensing pen 12 needs to use a high precision analog to digital converter to sense the strength of amplitude. If a high resolution is required, a highly precise analog to digital converter is required, resulting in the increase of the manufacturing cost. Moreover, the amplitude and energy caused by sensing voltage are difficult to control to get a good precision and to match the specification in mass production.

SUMMARY OF THE INVENTION

Accordingly, the primary object of the present invention is to provide a panel sensing device and a positioning location searching method of the same, wherein phase difference is used to determine a touch position of a sensing pen, and thus no precise analog to digital converter is required.

Another object of the present invention is to provide a panel sensing device and a positioning location searching method of the same, wherein the resolution can be improved by a simple digital to analog converter.

In accordance with one aspect of the present invention, there is provided a panel sensing device, which comprises: a sensing plate having a first side, a second side opposite to the first side, a third side and a fourth side opposite to the third side; a control unit for providing an adjustable first reference voltage, an adjustable second reference voltage, an adjustable third reference voltage, and an adjustable fourth reference voltage to the first side, second side, third side and fourth side, respectively, wherein the first reference voltage has a phase opposite to that of the second reference voltage, and the third reference voltage has a phase opposite to that of the fourth reference voltage, whereby the first to fourth reference voltages generate electric fields for distributing on the sensing plate to define a plurality of position blocks; and a sensing pen for touching the sensing plate to sense an object voltage on a touch position, whereby the control unit searches the touch position according to the phases and levels of the object voltage and the first to fourth reference voltages.

In accordance with another aspect of the present invention, there is provided a positioning location searching method for searching a touch position of a sensing pen on a sensing plate. The sensing plate has a first side, a second side opposite to the first side, a third side and a fourth side opposite to the third side. The method comprises the steps of: (A) providing an adjustable first reference voltage, an adjustable second reference voltage, an adjustable third reference voltage, and an adjustable fourth reference voltage to the first side, second side, third side and fourth side, respectively, wherein the first reference voltage has a phase opposite to that of the second reference voltage, and the third reference voltage has a phase opposite to that of the fourth reference voltage, whereby the first to fourth reference voltages generate electric fields for distributing on the sensing plate to define a plurality of position blocks; (B) using a sensing pen to touch the sensing plate in order to sense an object voltage at a touch position; (C) comparing the phase of the object voltage with the phases of the first to fourth reference voltages for determining a position block where the touch position is located; (D) adjusting the level of at least one of the first to fourth reference voltages to change the defined position blocks; and (E) comparing the phase of the object voltage with the first to fourth reference voltages again for determining the position block where the touch position is located so as to determine the touch position.

The various objects and advantages of the present invention will be more readily understood from the following detailed description when read in conjunction with the appended drawing.

DETAILED DESCRIPTION OF THE PREFERRED EMBODIMENTS

Figure 1:
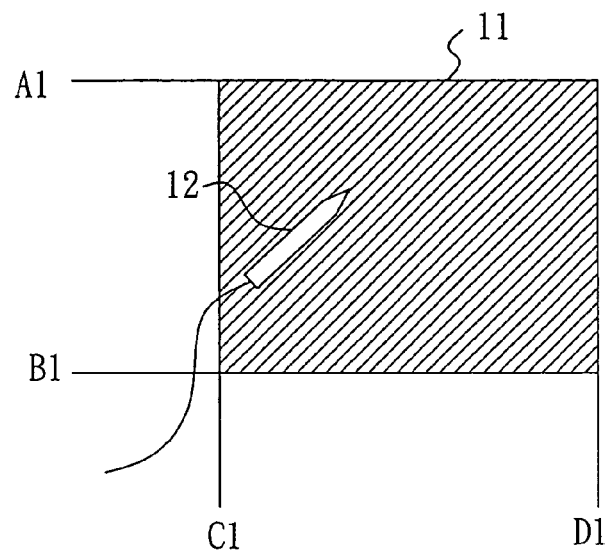
FIG. 1 is a schematic view of a prior art electronic book.
Figure 2:
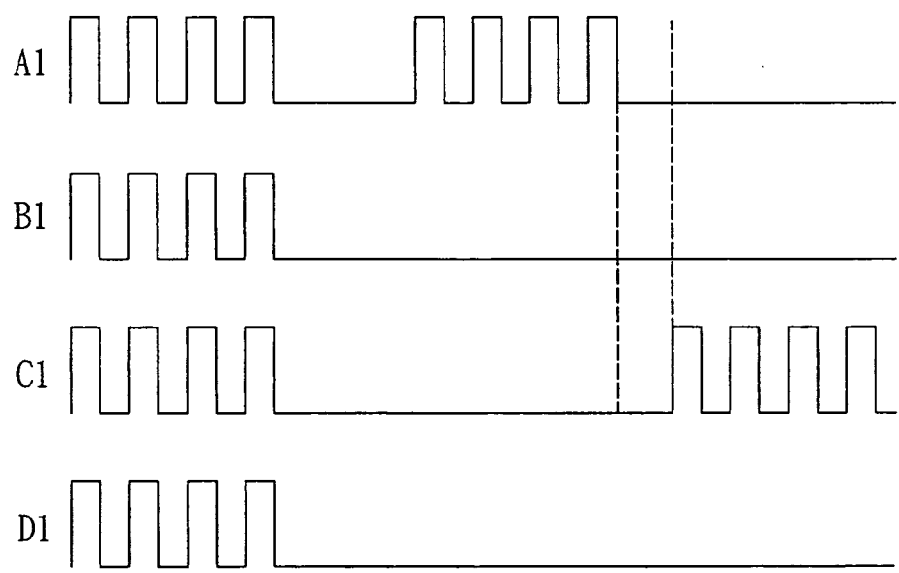
FIG. 2 is a schematic view of a sensed input driving wave of the prior art electronic book.
Figure 3:
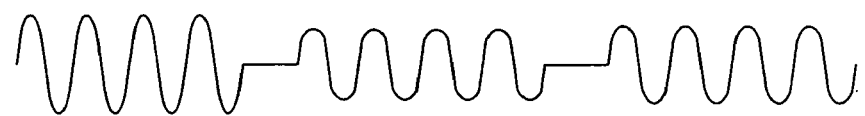
FIG. 3 is a schematic view about the sensing waveform of a prior art electronic book.
Figure 4:
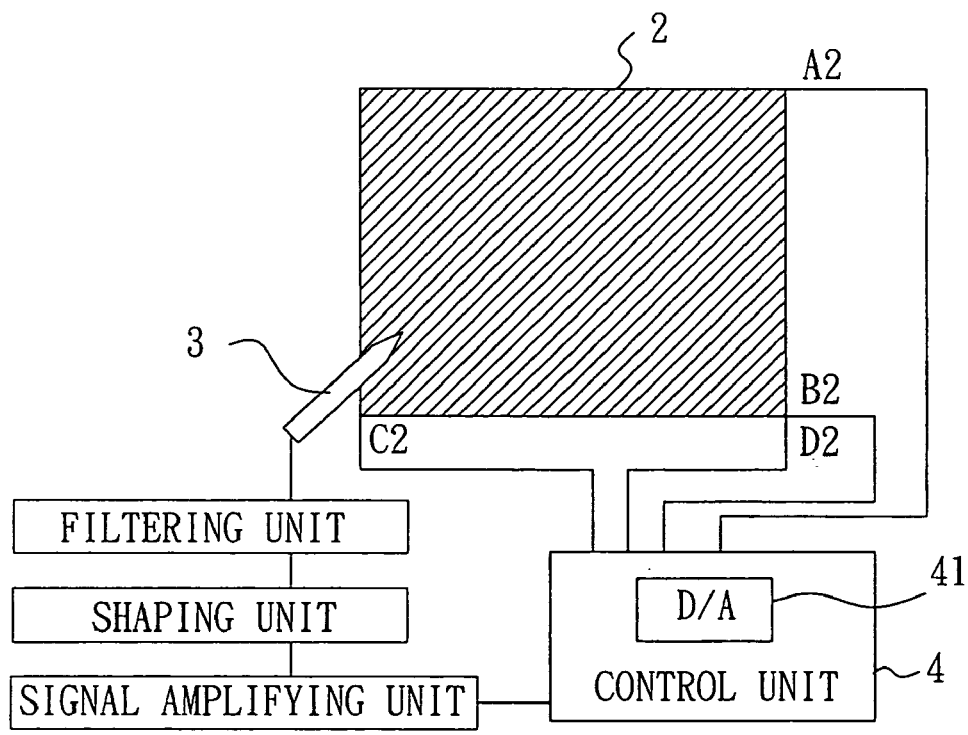
FIG. 4 is a schematic view showing the panel sensing device of the present invention.
Figure 5:
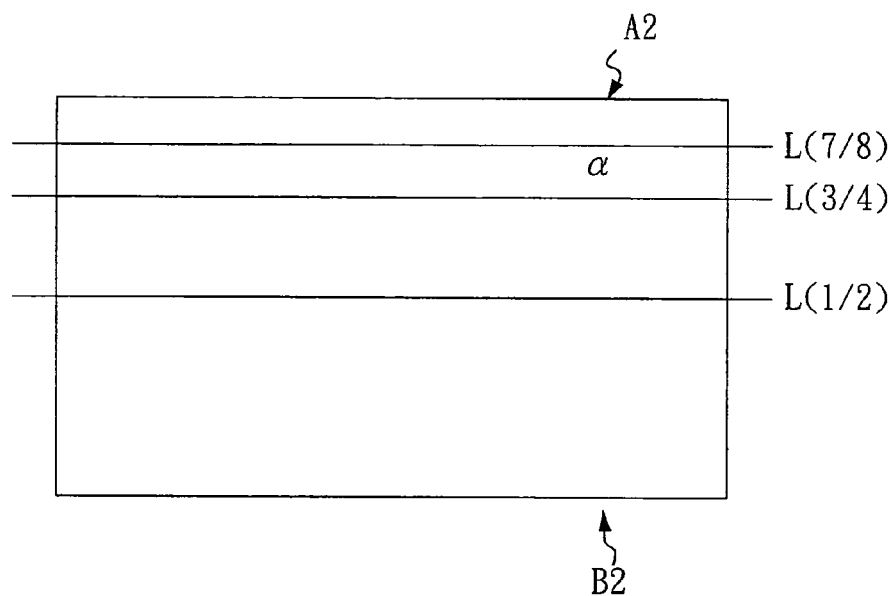
FIG. 5 is a schematic view showing one embodiment of the present invention.
Figure 5:
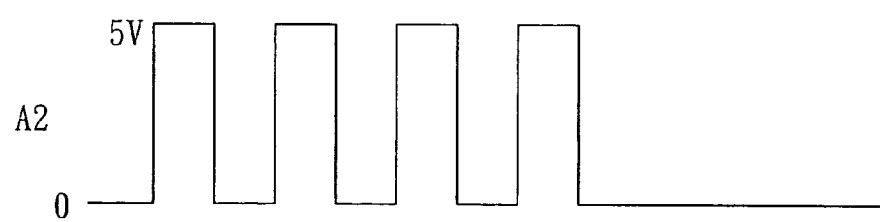
Figure 5:
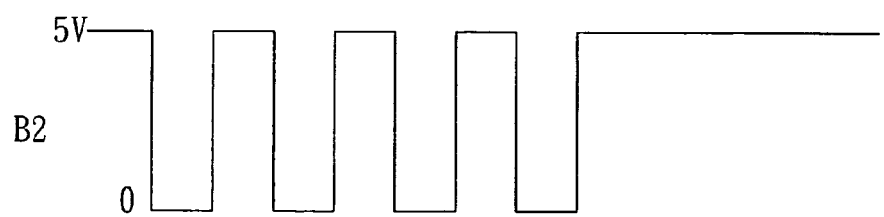
Figure 6:
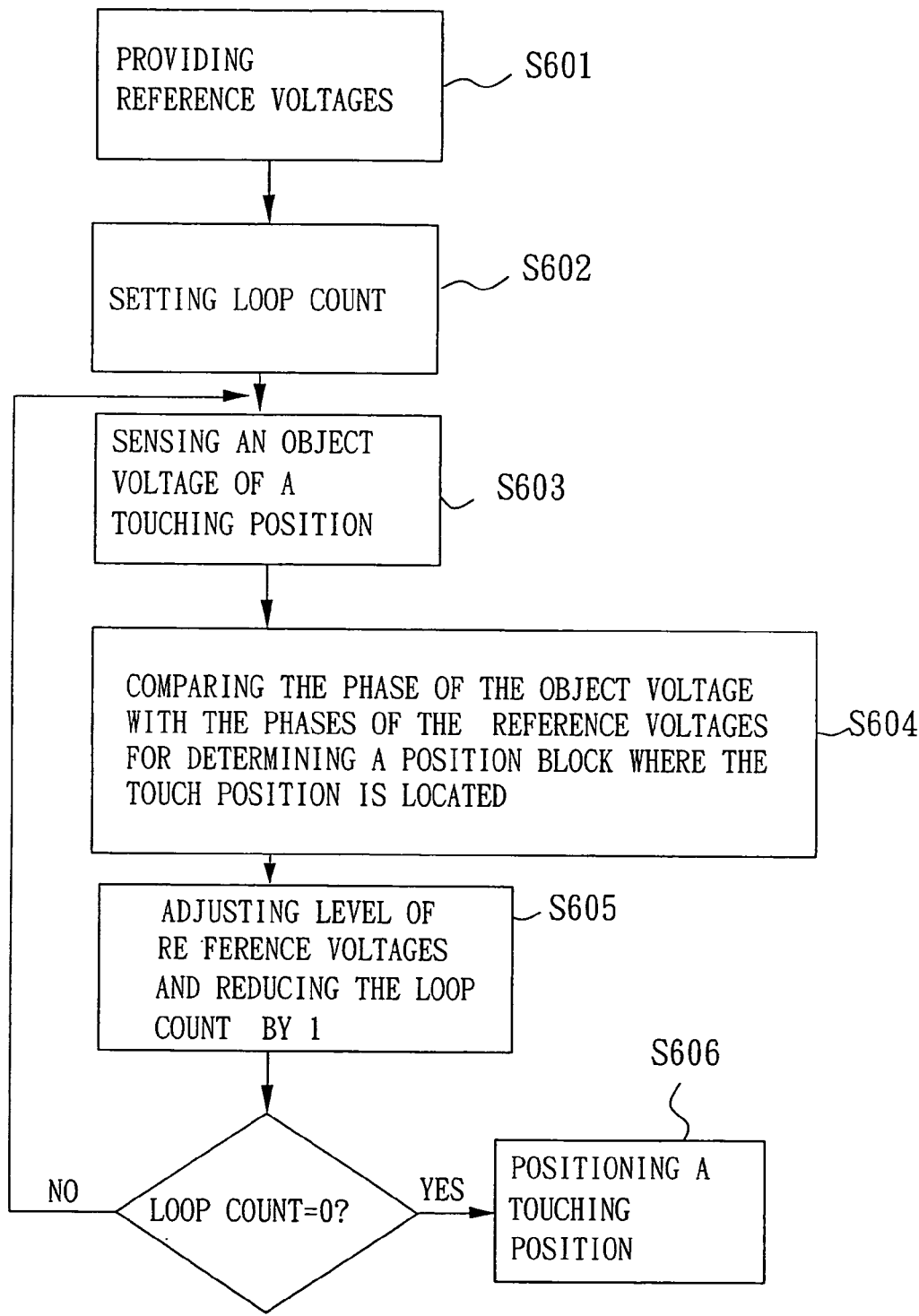
FIG. 6 shows one flow diagram of the present invention.

Referring to FIGS. 4 to 6, a schematic view of the panel sensing device and positioning location searching method of the same in accordance with the present invention is illustrated. The present invention includes a sensing plate 2, a sensing pen 3 and a control unit 4. The control unit 4 further includes a digital to analog converter 41 for converting digital values into analog reference voltages which are provided to the sensing plate 2. In this embodiment, the digital to analog converter 41 has preferably a seven-bit resolution, i.e., the digital to analog converter is a 7-bit digital to analog converter capable of converting a 7-bit digital value into an analog reference voltage thereby providing a resolution of 128 levels because 2 to the power of 7 is 128 ($2^7$=128. The sensing pen 3 is connected to the control unit 4 through a filtering unit, a shaping unit and a signal amplifying unit so that the control unit 4 can process the voltage sensed by the sensing pen 3.

The sensing plate 2 has four sides, denoted as A2, B2, C2 and D2. The side A2 is opposite to side B2 and the side C2 is opposite to side D2. The control unit 4 provides a reference voltage to the sides A2, B2, C2 and D2. The amplitude of the reference voltage of the side A2 is identical to that of the side B2, but have an opposite phase. The reference voltages inputted to the sides C2 and D2 are identical in amplitude but opposite to each other in phase, so that the phase differences of these reference voltages are used in area searching.

Next, an example is given by addressing the position of a row, i.e., the position in row of the sensing plate 2 where the sensing pen 3 touches. Referring to FIGS. 5 and 6, the control unit 4 serves for providing a reference voltage of positive phase to the side A2, where the reference voltage has an amplitude of 0 to 5V, and providing a reference voltage of negative phase to the side B2, where the reference voltage has an amplitude of 5 to 0 (step 601). The loop count for repeatedly adjusting the reference voltage level of the side A2 or B2 is set according to the precision degree of the electronic book and the searching algorithm used, so as to determine the touch position. In this embodiment, the precision degree of the electronic book is 128 bits and the searching algorithm is a binary search algorithm. The loop count is seven times (step 602). Then, the sensing pen 3 touches an α position of the sensing plate 2 for sensing the object voltage of the α position. For example, the object voltage is a positive phase voltage with an amplitude of 3V (step 603).

Next, the phase of the object voltage is compared with the phases of the reference voltages at sides A2 and B2 so as to determine the touch position of the sensing pen 3. In this embodiment, the phase of the object voltage is identical to the phase of the reference voltage of the side A2. Therefore, it is determined that the touch position of the sensing pen 3 is near the side A2 (step S604). That is, the touch position of the sensing pen 3 is located in a block between the side A2 and a cutting line L(1/2) which equally divides the sensing plate 2. Thus, the reference voltage level of the side A2 is adjusted to have a smaller range (half range in this example) through the control unit 4. In this embodiment, because the binary search algorithm is employed, the reference voltage level of the side A2 is adjusted to be a positive reference voltage having an amplitude with a value between 5×1/2=2.5V to 5V. Then, the loop count is decreased (step S605). When the loop count is not equal to zero, the steps S603, S604 and S605 are executed repeatedly. For example, the phase of the object voltage is compared with the adjusted phases of the sides A2 and B2. Now, the phase of the object voltage is identical to the phase of side A2. Thereby, it is determined that touching position (α) of the sensing pen 3 is located in a block between the side A2 and a cutting line L(3/4) which equally divides the area between the side A2 and the cutting line L(1/2). The reference voltage level of the side A2 is adjusted to be a positive reference voltage having an amplitude with a value between 5×3/4=3.75V to 5V. Next, the loop count is reduced by 1, and the phase of the object voltage is compared with the adjusted phases of the sides A2 and B2. Now, the phase of the object voltage is identical to the phase of side B2. Thereby, it is determined that touching position (α) of the sensing pen 3 is located in a block between the cutting line (3/4) and a cutting line L(7/8) which equally divides the area between the side A2 and the cutting line L(3/4). Again, the loop count of the reference voltage is then reduced by 1, and the process continues until the loop count is 0. Then the touch position (row address) is determined (step S606).

The process for positioning the column address is identical to that for positioning the row address as described above, and thus a detailed description is deemed unnecessary. The above method for searching the touch point of the sensing pen 3 is determined by phase difference and binary searching algorithm. However, the panel sensing device of the present invention can also use other searching algorithm to position the touch position.

It is known from above description that the sensing plate of the present invention provides at least one reference voltage and at least one reverse phase reference voltage. The phase and level of the object voltage sensed by the sensing pen to touch the sensing plate is compared with the phase of the reference voltage so as to acquire the touch position of the sensing pen. Thereby, no analog to digital converter of high precision is required. Furthermore, a simple digital to analog converter can be used to increase the resolution. Thus, the circuit design is simple and the mass production can be done easily.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A panel sensing device comprising:
   a sensing plate having a first side, a second side opposite to the first side, a third side and a fourth side opposite to the third side;
   a control unit for providing a first reference voltage, a second reference voltage, a third reference voltage, and a fourth reference voltage to the first side, the second side, the third side and the fourth side, respectively, wherein the first reference voltage has a phase opposite to that of the second reference voltage, and the third reference voltage has a phase opposite to that of the fourth reference voltage, whereby the first to fourth reference voltages generate electric fields for distribution over the sensing plate to define a plurality of position blocks; and
   a sensing pen for touching a touch position of the sensing plate to sense an object voltage representing the touch position, whereby the control unit searches for the touch position according to the object voltage and the first to fourth reference voltages.

2. The panel sensing device as claimed in claim 1, wherein the control unit compares the phase of the object voltage with the phases of the first to fourth reference voltages for determining a position block where the touch position is located, changes the position block by adjusting a level of at least one reference voltage and then compares the phase of the object voltage with the phases of the adjusted first to fourth reference voltages, repeatedly changes the position block, and then compares the phases until the touch position is determined.

3. The panel sensing device as claimed in claim 1, wherein the control unit includes a digital to analog (D/A) converter for converting digital values into the first to fourth analog reference voltages.

4. The panel sensing device as claimed in claim 3, wherein the digital to analog converter is a 7-bit digital to analog converter capable of converting a 7-bit digital value into an analog reference voltage for providing a resolution of 128 bits.

5. A positioning location searching method for searching a touch position of a sensing pen on a sensing plate, the sensing plate having a first side, a second side opposite to the first side, a third side and a fourth side opposite to the third side, the method comprising the steps of:
- (A) providing a first reference voltage, a second reference voltage, a third reference voltage, and a fourth reference voltage to the first side, the second side, the third side and the fourth side, respectively, wherein the first reference voltage has a phase opposite to that of the second reference voltage, and the third reference voltage has a phase opposite to that of the fourth reference voltage, whereby the first to fourth reference voltages generate electric fields for distribution over the sensing plate to define a plurality of position blocks;
- (B) using a sensing pen to touch a touch position of the sensing plate in order to sense an object voltage representing the touch position;
- (C) comparing the phase of the object voltage with the phases of the first to fourth reference voltages for determining a position block where the touch position is located;
- (D) adjusting a level of at least one of the first to fourth reference voltages to change the defined position blocks and then comparing the phase of the object voltage with the first to fourth reference voltages adjusted; and
- (E) repeating step (D) until the touch position is determined.

* * * * *